United States Patent
Kim et al.

(10) Patent No.: US 10,574,404 B2
(45) Date of Patent: Feb. 25, 2020

(54) METHOD FOR TRANSMITTING OR RECEIVING A HARQ-ACK SIGNAL IN WIRELESS COMMUNICATION SYSTEM, AND DEVICE THEREFOR

(71) Applicant: LG ELECTRONICS INC., Seoul (KR)

(72) Inventors: Bonghoe Kim, Seoul (KR); Kijun Kim, Seoul (KR); Byounghoon Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,090

(22) PCT Filed: Apr. 19, 2017

(86) PCT No.: PCT/KR2017/004169
§ 371 (c)(1),
(2) Date: Jun. 21, 2018

(87) PCT Pub. No.: WO2017/183896
PCT Pub. Date: Oct. 26, 2017

(65) Prior Publication Data
US 2019/0020445 A1 Jan. 17, 2019

Related U.S. Application Data

(60) Provisional application No. 62/326,023, filed on Apr. 22, 2016.

(51) Int. Cl.
*H04L 1/18* (2006.01)
*H04L 1/00* (2006.01)
(Continued)

(52) U.S. Cl.
CPC .......... *H04L 1/1861* (2013.01); *H04L 1/0047* (2013.01); *H04L 1/0057* (2013.01);
(Continued)

(58) Field of Classification Search
CPC ... H04L 1/0047; H04L 1/0057; H04L 1/1812; H04L 1/001; H04L 1/18; H04L 1/1861; H04L 5/00; H04W 72/042
See application file for complete search history.

(56) References Cited

U.S. PATENT DOCUMENTS

| | | | |
|---|---|---|---|
| 2011/0044180 A1 | 2/2011 | Kim | |
| 2012/0005550 A1* | 1/2012 | Ito ........................ | H04L 1/0003 714/748 |

(Continued)

FOREIGN PATENT DOCUMENTS

| | | |
|---|---|---|
| CN | 101615986 | 12/2009 |
| CN | 104301077 | 1/2015 |

(Continued)

OTHER PUBLICATIONS

PCT International Application No. PCT/KR2017/004169, Written Opinion of the International Searching Authority dated Jul. 18, 2017, 14 pages.

*Primary Examiner* — Mewale A Ambaye
(74) *Attorney, Agent, or Firm* — Lee Hong Degerman Kang & Waimey

(57) ABSTRACT

A method for transmitting a hybrid automatic repeat and request (HARQ) ACK/NACK signal by a reception side in a wireless communication system may further comprise the steps of: receiving a transmission block including a plurality of code blocks from a transmission side; decoding the received transmission block; and transmitting an ACK/NACK for the transmission block in units of code block groups, wherein the code.

16 Claims, 8 Drawing Sheets

(51) Int. Cl.
  *H04W 72/04* (2009.01)
  *H04L 5/00* (2006.01)
(52) U.S. Cl.
  CPC ......... *H04L 1/1812* (2013.01); *H04W 72/042* (2013.01); *H04L 5/001* (2013.01)

(56) References Cited

U.S. PATENT DOCUMENTS

| | | | |
|---|---|---|---|
| 2013/0294357 A1 | 11/2013 | Shimanuki et al. | |
| 2013/0301586 A1 | 11/2013 | Fan et al. | |
| 2015/0067435 A1* | 3/2015 | Yerramalli | H04L 1/0006 714/748 |
| 2016/0028505 A1 | 1/2016 | Pi et al. | |
| 2018/0278379 A1* | 9/2018 | Sun | H04L 1/08 |
| 2018/0278399 A1* | 9/2018 | Sundararajan | H04L 1/1635 |

FOREIGN PATENT DOCUMENTS

| | | |
|---|---|---|
| KR | 1020090125080 | 12/2009 |
| WO | 2016003229 | 1/2016 |
| WO | 2016021957 | 2/2016 |

\* cited by examiner

METHOD FOR TRANSMITTING OR RECEIVING A HARQ-ACK SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/004169, filed on Apr. 19, 2017, which claims the benefit of U.S. Provisional Application No. 62/326,023, filed on Apr. 22, 2016, the contents of which are all hereby incorporated by reference herein in their entirety.

TECHNICAL FIELD

The present invention relates to a wireless communication system, and more particularly, to a method of transmitting/receiving a HARQ ACK/NACK signal in a wireless communication system and an apparatus therefor.

BACKGROUND ART

The present invention proposes new and various frame structures for a $5^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like.

The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

DISCLOSURE OF THE INVENTION

Technical Tasks

A technical task of the present invention is to provide a method for a receiving side to transmit a HARQ (hybrid automatic repeat and request) ACK/NACK signal in a wireless communication system.

Another technical task of the present invention is to provide a method for a transmitting side to receive a HARQ (hybrid automatic repeat and request) ACK/NACK signal in a wireless communication system.

Another technical task of the present invention is to provide a receiving side device transmitting a HARQ (hybrid automatic repeat and request) ACK/NACK signal in a wireless communication system The other technical task of the present invention is to provide a transmitting side device transmitting a HARQ (hybrid automatic repeat and request) ACK/NACK signal in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for transmitting a HARQ (hybrid automatic repeat and request) ACK/NACK signal by a receiving side in a wireless communication system, includes the steps of receiving a transport block including a plurality of code blocks from a transmitting side, decoding the received transport block, and transmitting ACK/NACK for the transport block in a unit of a code block group. In this case, the code block group can include at least one or more code blocks.

When the code block group includes a plurality of code blocks, an ACK signal can be transmitted only when the plurality of the code blocks are all successfully decoded.

When the code block group includes a plurality of code blocks, an NACK signal can be transmitted when it fails to decode any one of the plurality of the code blocks.

The method may further include if NACK for the code block group is transmitted, receiving downlink control information for retransmission from the transmitting side. In this case, the downlink control information may include a number of code block to be retransmitted, a code block index, or a code block group index. The method may further include the step of receiving downlink control information for initial transmission of the transport block from the transmitting side. In this case, the downlink control information for the initial transmission may include information on the transport block.

To further achieve these and other advantages and in accordance with the purpose of the present invention, according to a different embodiment, a method for receiving a HARQ (hybrid automatic repeat and request) ACK/NACK signal by a transmitting side in a wireless communication system, includes the steps of transmitting a transport block including a plurality of code blocks to a receiving side and receiving ACK/NACK for the transport block in a unit of a code block group. In this case, the code block group can include at least one or more code blocks.

When the code block group includes a plurality of code blocks, an ACK signal may be received from the receiving side only when the plurality of the code blocks are all successfully decoded.

When the code block group includes a plurality of code blocks, an NACK signal may be received from the receiving side when it fails to decode any one of the plurality of the code blocks.

The method may further include, if NACK for the code block group is received, transmitting downlink control information for retransmission to the receiving side. In this case, the downlink control information may include a number of code block to be retransmitted, a code block index, or a code block group index.

The method may further include the step of transmitting downlink control information for initial transmission of the transport block. In this case, the downlink control information for the initial transmission may include information on the transport block. To further achieve these and other advantages and in accordance with the purpose of the present invention, according to a further different embodiment, a receiving side apparatus for transmitting a HARQ (hybrid automatic repeat and request) ACK/NACK signal in a wireless communication system includes a receiver configured to receive a transport block including a plurality of code blocks from a transmitting side, a processor configured to decode the received transport block, and a transmitter configured to transmit ACK/NACK for the transport block in a unit of a code block group. In this case, the code block group may include at least one or more code blocks.

When the code block group includes a plurality of code blocks, the transmitter may transmit an ACK signal only when the plurality of the code blocks are all successfully decoded.

When the code block group includes a plurality of code blocks, the transmitter may transmit an NACK signal if it fails to decode any one of the plurality of the code blocks.

The transmitter may transmit one ACK/NACK per to the code block group. The transmitter may transmit the ACK/NACK via PUSCH (physical uplink shared channel).

To further achieve these and other advantages and in accordance with the purpose of the present invention, according to a further different embodiment, a transmitting side apparatus for receiving a HARQ (hybrid automatic repeat and request) ACK/NACK signal in a wireless communication system includes a transmitter configured to transmit a transport block including a plurality of code blocks to a receiving side and a receiver configured to receive ACK/NACK for the transport block in a unit of a code block group. In this case, the code block group can include at least one or more code blocks.

When the code block group includes a plurality of code blocks, the receiver may receive an ACK signal from the receiving side only when the plurality of the code blocks are all successfully decoded.

When the code block group includes a plurality of code blocks, the receiver may receive an NACK signal from the receiving side when it fails to decode any one of the plurality of the code blocks.

The transmitter may transmit one ACK/NACK per the code block group.

The receiver may receive the ACK/NACK via PUSCH (physical uplink shared channel).

Advantageous Effects

According to one embodiment of the present invention, it is able to solve a problem of retransmitting the entire transport blocks retransmitted by a transmitting side by transmitting ACK/NACK in a unit of a code block group including one or more code blocks, thereby enhancing overall performance of a system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Mode for Invention

Figure 1:
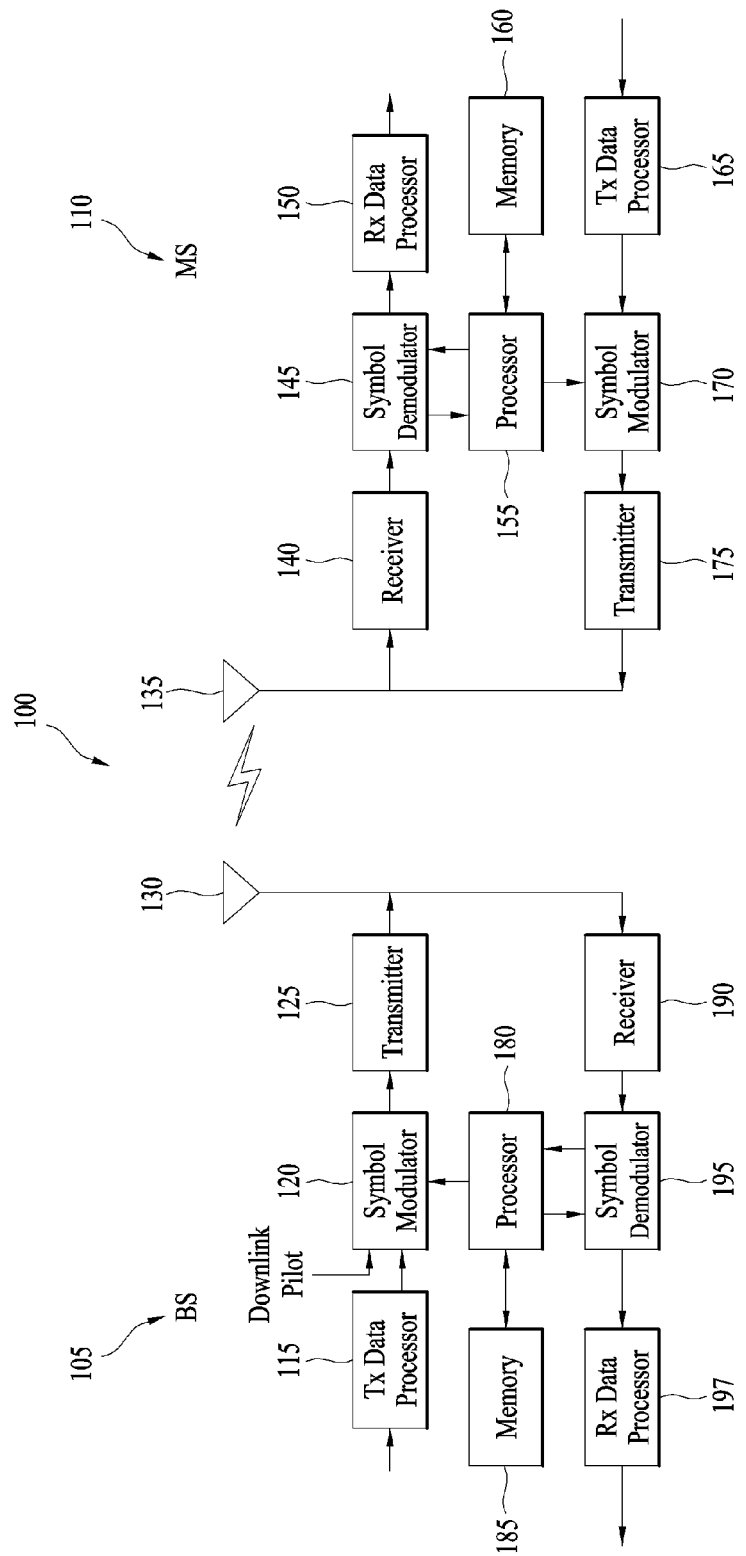
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
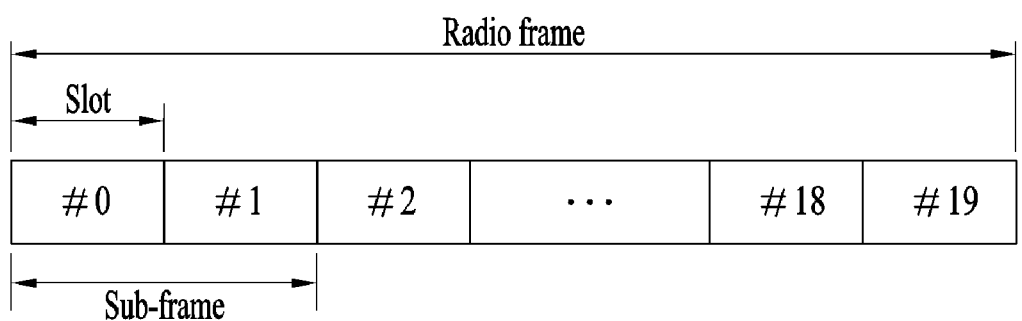
FIG. 2 is a diagram for LTE/LTE-A frame structure.

FIG. 2 is a diagram for LTE/LTE-A frame structure.

Referring to FIG. 2, a frame corresponds to 10 ms and includes 10 1-ms subframes. A time for transmitting one subframe is defined as a transmission time interval (TTI). For example, one subframe includes 2 0.5-ms slots. One slot includes 7 (or 6) orthogonal frequency division multiplexing (OFDM) symbols. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame shown in FIG. 2 is shown for exemplary purposes only. Thus, the number of subframes included in the radio frame or the number of slots included in the subframe or the number of OFDM symbols included in the slot may be modified in various manners.

One RB (resource block) is defined by 12 subcarriers of an interval of 15 kHz and 7 OFDM symbols. A base station transmits a primary synchronization signal (PSS) and a secondary synchronization signal (SSS) for synchronization and a physical broadcast channel (PBCH) for system information on a center frequency (6 RBs). In this case, a structure of the radio frame, a signal, and a channel may vary according to a normal/extended CP (cyclic prefix), TDD (time division duplex)/FDD (frequency division duplex).

Figure 3:
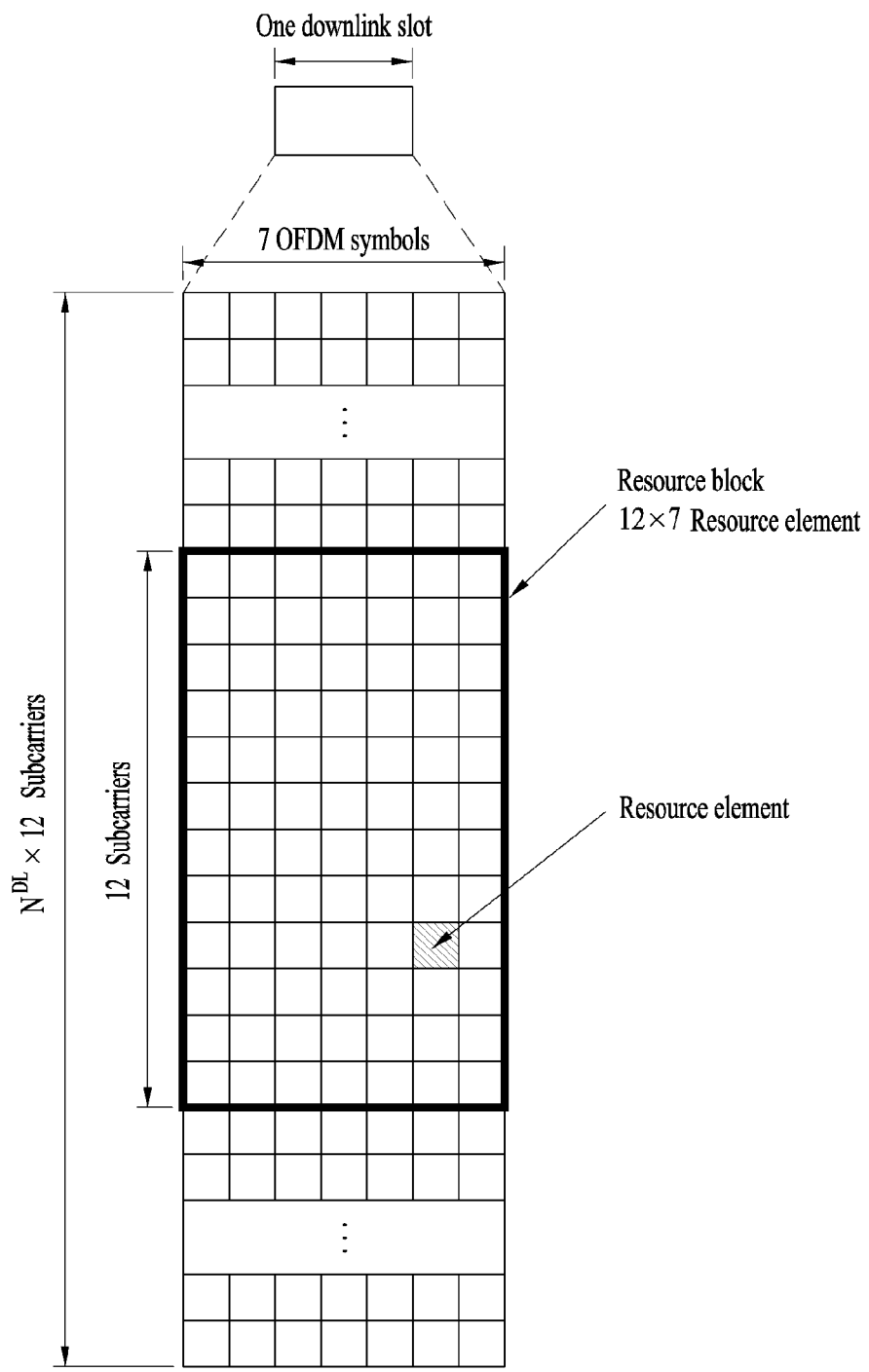
FIG. 3 is a diagram for an example of a resource grid of a downlink slot of 3GPP LTE/LTE-A system as one example of a wireless communication system.

FIG. 3 is a diagram for an example of a resource grid of a downlink slot of 3GPP LTE/LTE-A system as one example of a wireless communication system.

Referring to FIG. 3, a downlink slot includes a plurality of OFDM symbols in time domain. It is described herein that one downlink slot includes 7 (or 6) OFDM symbols, and one resource block (RB) includes 12 subcarriers in frequency domain. Each element on the resource grid is referred to as a resource element (RE). One RB includes 12×7(6) REs. The number N of RBs included in the downlink slot depends on a downlink transmit bandwidth. The structure of an uplink slot may be same as that of the downlink slot. In this case, OFDM symbol is replaced with SC-FDMA symbol.

Figure 4:
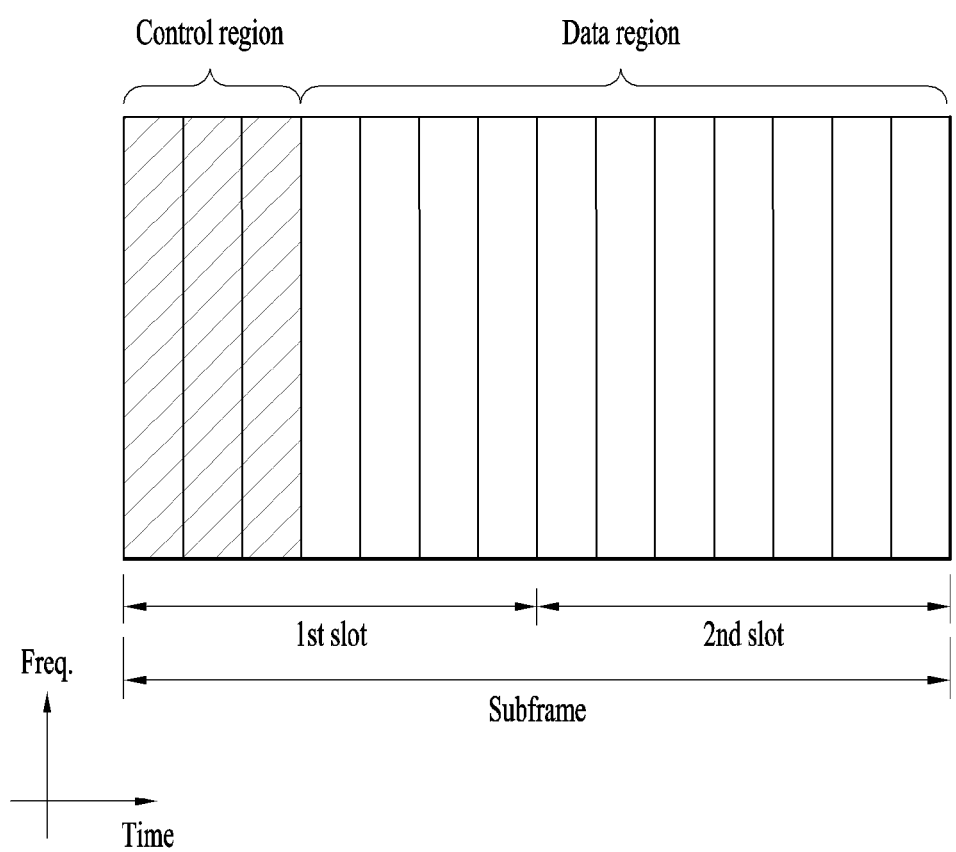
FIG. 4 is a diagram for an example of a downlink subframe structure of 3GPP LTE system as one example of a wireless communication system.

FIG. 4 is a diagram for an example of a downlink subframe structure of 3GPP LTE/LTE-A system as one example of a wireless communication system.

Referring to FIG. 4, a maximum of three (or four) OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). A DCI format 0 is defined for UL and DCI formats 1, 1A, 1B, 1C, 1D, 2, 2A, 3, 3A, etc. are defined for DL. The DCI format selectively includes information such as a hopping flag, RB allocation, MCS (modulation coding scheme), an RV (redundancy version), an NDI (new data indicator), TPC (transmit power control), a cyclic shift DMRS (demodulation reference signal), CQI (channel quality information) request, HARQ process number, a TPMI (transmitted precoding matrix indicator), PMI (precoding matrix indicator) confirmation, and the like according to a usage.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel The CCE corresponds to a plurality of resource element groups (REGs). A format of the PDCCH and the number of bits of the available PDCCH are determined according to a correlation between the number of CCEs and the coding rate provided by the CCEs. The base station determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB)), a system information identifier and a system information RNTI (SI-RNTI) may be masked to the CRC. To indicate a random access response, a random access-RNTI (RA-RNTI) may be masked to the CRC.

Figure 5:
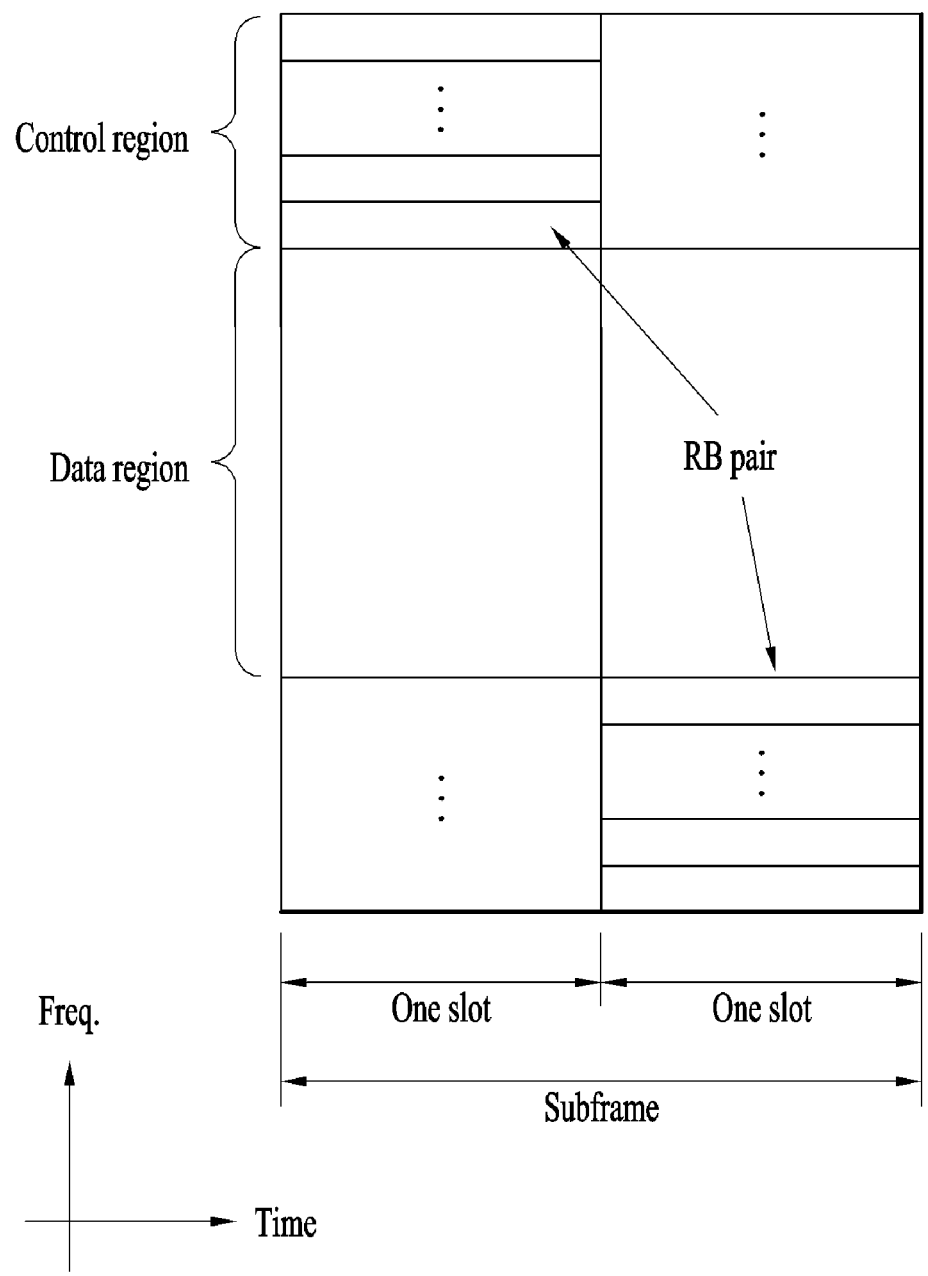
FIG. 5 is a diagram for an example of an uplink subframe structure of 3GPP LTE system as one example of a wireless communication system.

FIG. 5 is a diagram for an example of an uplink subframe structure of 3GPP LTE/LTE-A system as one example of a wireless communication system.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit ACK/NACK is transmitted as a response to a single downlink codeword and a 2-bit ACK/NACK is transmitted as a response to two downlink codewords.

Channel Quality Information (CQI): This is feedback information about a downlink channel MIMO (Multiple Input Multiple Output)-related feedback information includes a rank indicator (RI), a precoding matrix indicator (PMI), and a precoding type indicator (PTI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

PDCCH (Physical Downlink Control Channel) Transmission

PDCCH corresponds to a downlink control channel. The PDCCH is configured to transmit control information for transmitting PDSCH/PUSCH for a specific UE and transmit a power control command for a plurality of UEs. The PDCCH occupies maximum 4 OFDM symbols in time domain and indicates the number of OFDM symbols assigned to the PDCCH using PCFICH. Meanwhile, the PDCCH is transmitted over the whole band in frequency domain and uses QPSK for modulation. A resource used for transmitting the PDCCH is referred to as a CCE (control channel element). Since a CCE includes 36 resource elements, it may be able to transmit 72 bits via a single CCE. The amount of control information transmitted on the PDCCH may vary depending on a transmission mode. Control information according to a transmission mode is regulated by a DCI format. A UE determines whether or not PDSCH/PUSCH is transmitted according to a PDCCH decoding result. In this case, PDCCH scrambling is performed using UE ID information (C-RNTI) of a corresponding UE. In particular, if a UE detects a DCI format, which is transmitted in a manner of being scrambled by a UE ID of the UE, the UE transmits PDSCH or receives PUSCH according to PDCCH control information. In general, one subframe includes a plurality of PDCCHs capable of being transmitted. Hence, it is necessary for a UE to check whether or not there is control information transmitted to the UE by performing decoding on a plurality of the PDCCHs. However, if the UE performs decoding on all of a plurality of the PDCCHs, complexity is considerably increased. Hence, it is necessary to set a limit on the number of performing decoding. When control information is transmitted via PDCCH, the control information can be transmitted in a manner of concatenating one or a plurality of CCEs with each other. This is referred to as CCE aggregation. Currently, a CCE aggregation level is permitted by 1, 2, 4 and 8. If the CCE aggregation level corresponds to 4, it indicates that control information of a corresponding UE is transmitted in a manner of concatenating 4 CCEs with each other. A UE sets limit on the decoding number according to each aggregation level. Table 1 in the following shows the decoding number according to an aggregation level.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 1, in case of a common type, a UE performs decoding on PDCCHs, which are transmitted by an aggregation level 4 and 8, 4 times and 2 times, respectively, to determine whether or not control information is transmitted. A specific CCE constructing PDCCH corresponds to a region commonly known to all UEs. In case of a UE-specific type, unlike the common type, a UE performs decoding on PDCCHs, which are transmitted by an aggregation level 1, 2, 4, and 8, 6, 6, 2 and 2 times, respectively, to determine whether or not control information is transmitted. In this case, a CCE is differently configured according to a UE. This can be represented as equation 1 in the following.

$$Y_k = (A \cdot Y_{k-1}) \bmod D \qquad \text{[Equation 1]}$$

In this case, $Y_{-1} = n_{RNTI} \neq 0$, A=39827, D=65537 and k=$\lfloor n_s/2 \rfloor$. $n_s$ corresponds to a slot number in a radio frame.

Figure 6:
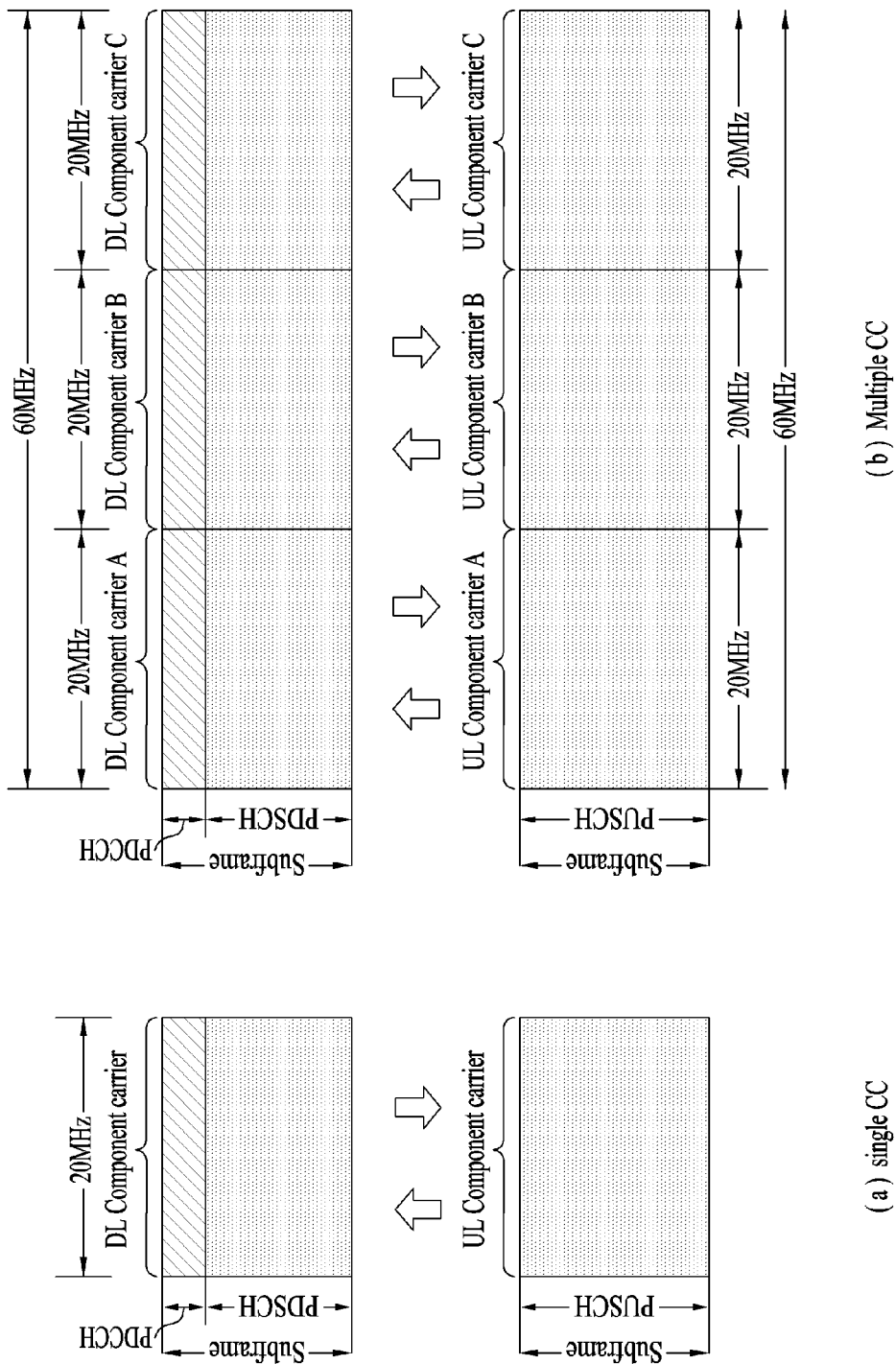
FIG. 6 illustrates an example of CCs and CA in the LTE-A system, which are used in embodiments of the present disclosure.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
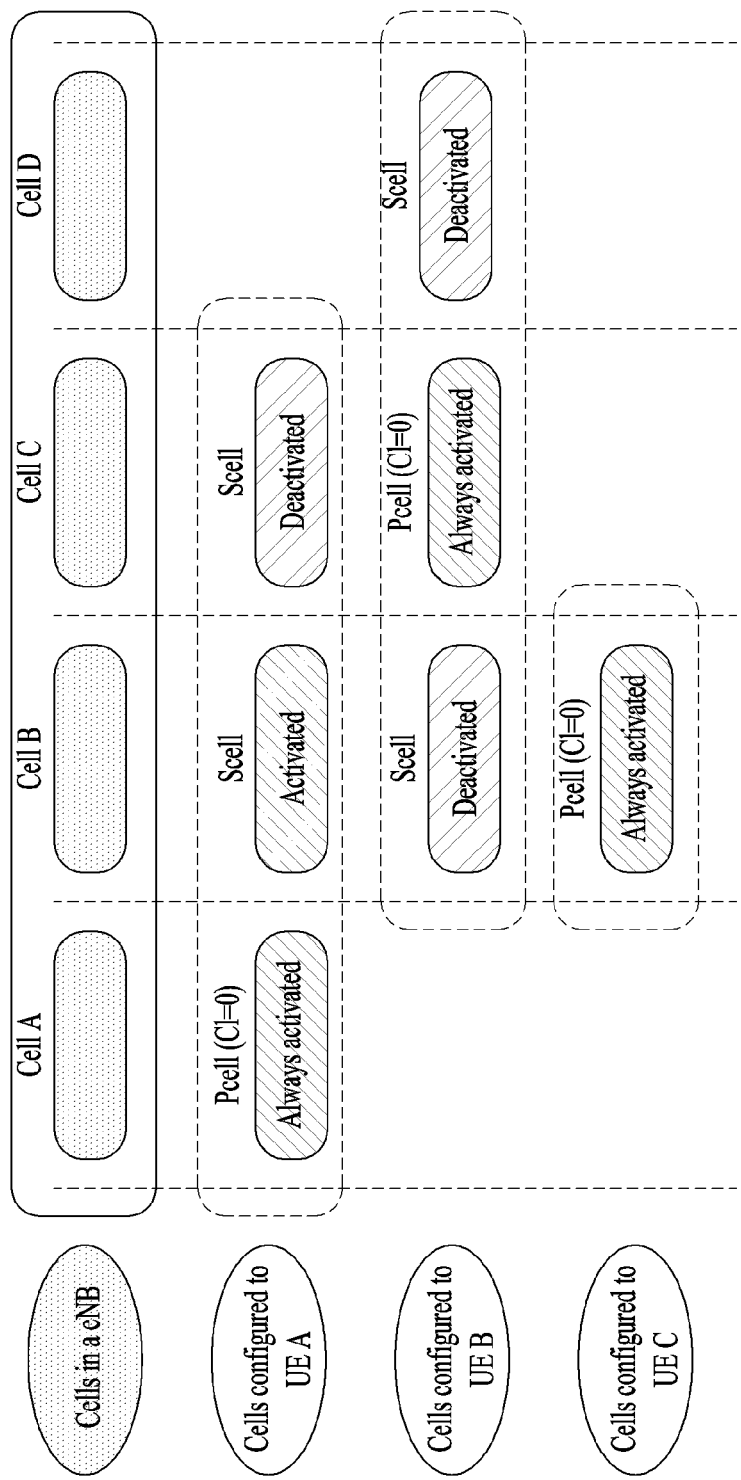
FIG. 7 is a diagram illustrating an example of configuring a serving cell according to cross-carrier scheduling.

FIG. 7 is a diagram illustrating an example of configuring a serving cell according to cross-carrier scheduling.

Referring to FIG. 7, a base station and/or UEs for use in a radio access system supporting carrier aggregation (CA) may include one or more serving cells. In FIG. 7, the base station can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and SCell may be activated or deactivated by the base station and/or UE.

The cells shown in FIG. 7 may be configured per UE. The above-mentioned cells selected from among cells of the base station, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by a base station command or a timer operation, and CRS reporting and SRS transmission are interrupted.

Physical Resource Block (PRB) Bundling

In case of a UE supporting a transmission mode 9, the UE can configure PMI/RI feedback via higher layer. The transmission mode 9 UE to which the PMI/RI feedback is set may make an assumption on granularity of a physical resource block that applies the same precoding to PDSCH and a DM RS. In particular, the UE performs channel estimation under the assumption that the same precoding is applied to a precoding resource block group (PRG) according to a system bandwidth to enhance channel estimation capability. Table 2 in the following shows values of a PRG size according to a system bandwidth.

TABLE 2

| System bandwidth ($N_{RB}^{DL}$) | PRG size (PRBs) |
| --- | --- |
| <=10 | 1 |
| 11~26 | 2 |
| 27~63 | 3 |
| 64~110 | 2 |

Channel Coding

Figure 8:
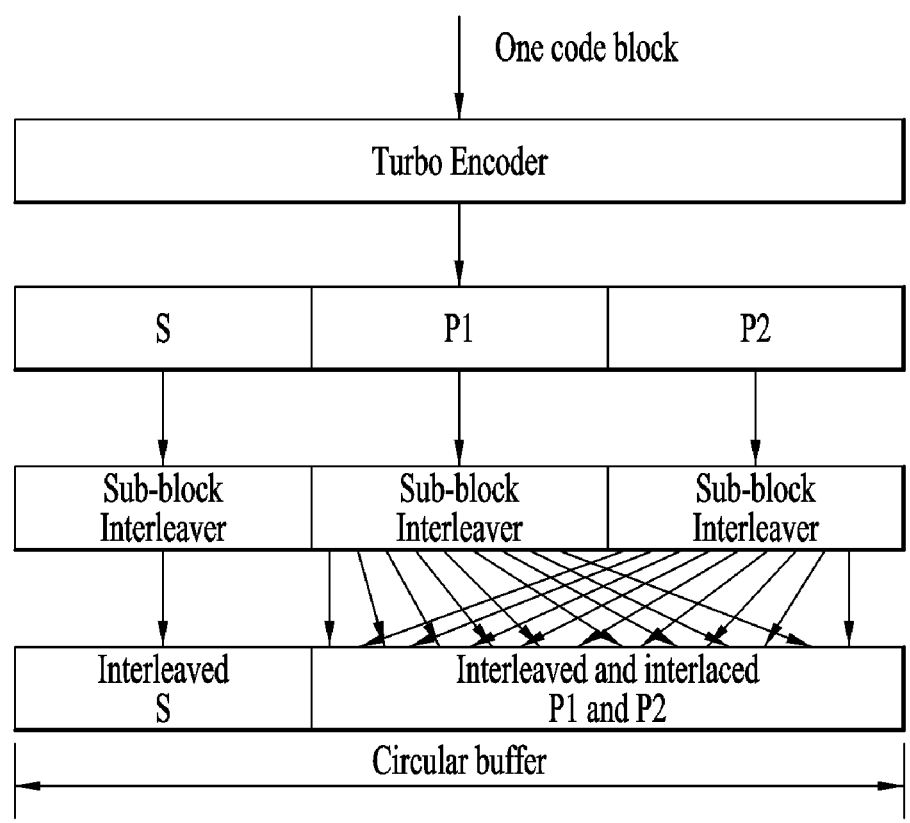
FIG. 8 is a block diagram illustrating rate matching which is performed by separating an encoded code block (CB) into a systematic part and a parity part.

FIG. 8 is a block diagram illustrating rate matching which is performed by separating an encoded code block (CB) into a systematic part and a parity part.

In a general communication system, in order to make a receiving end correct an error occurred at a channel, a transmitting end performs coding on information transmitted by the transmitting end using an error correction code and transmits the information. Having received the information, the receiving end performs demodulation on a reception signal, performs a decoding procedure on the error correction code, and restores the information. An error of the reception signal caused by a channel can be corrected by the decoding procedure. The error correction code may include various types. In the present invention, a turbo code is explained as an example of the error correction code. The turbo code consists of a recursive systematic convolution encoder and an interleaver. When the turbo code is actually implemented, an interleaver may exist to easily perform parallel decoding. QPP (quadratic polynomial permutation) is a sort of the interleaver. It is known as the QPP interleaver maintains good performance on a specific data block size only. It is known as the performance of the turbo code is getting better as a size of a data block is getting bigger. In an actual communication system, if a data block has a size equal to or greater than a prescribed size, the data block is divided into a plurality of small data blocks to easily perform encoding. A divided small data block is referred to as a code block. In general, code blocks have the same size. Yet, due to a size restriction of the QPP interleaver, one of a plurality of code blocks may have a different size. The error correction encoding procedure is performed in a unit of a determined interleaver size code block and interleaving is performed to reduce an impact of a burst error, which occurs when transmission is performed via a radio channel. The code block is transmitted in a manner of being mapped to an actual radio resource. Since the amount of radio resources used for performing actual transmission is constant, it is necessary to perform rate matching on the encoded code block to match with the amount of radio resource. In general, rate matching includes puncturing and repetition. The rate matching can be performed in such a unit of an encoded code block as WCDMA of 3GPP. As a different method, it may be able to separately perform the rate matching in a manner of dividing the encoded code block into a systematic part and a parity part.

In this case, a CRC for detecting an error is attached to a data block transmitted by higher layer. For clarity of implementation, a CRC is attached to a segmented code block as well. It is necessary to define various data block sizes according to a service type of higher layer. Yet, since it is necessary to signal the various data block sizes to a receiving end, quantization is required. When the quantization is performed, in order to match a size of a source data block transmitted by higher later with a size of a data block of a physical layer, a dummy bit is attached. When the quantization is performed, it is preferable to minimize the amount of attached dummy bits. A data block size, modulation and coding rate, and the number of allocated resources become functional relation with each other. In particular, one parameter is determined by values of other two parameters. Hence, in case of signaling parameters, it may signal two parameters only. In the following, for clarity, assume that modulation and coding rate and the number of allocated resources are used to inform a receiving end of a data block size. In this case, a pilot signal or a reference signal for channel estimation, a resource for transmitting control information, and the like may influence on the number of allocated resources according to an antenna configuration. A factor influencing on the number of allocated resources may change at every transmission instant.

MCS (Modulation and Coding Scheme) Signaling

A base station uses a DL control channel (e.g., PDCCH/EPDCCH (enhanced PDCCH) to deliver a data block size to a receiving side (e.g., UE). The base station can transmit information on the data block size to the receiving side on PDSCH by combining MCS corresponding to information on a modulation and coding rate with resource allocation information. The MCS is configured by 5 bits and a resource can be allocated using 1 RB to 110 RBs. In particular, in case of non-MIMO, it may be able to signal a data block size (overlapped size is permitted) as much as 32*110. However, since 3 states of the MCS field, which is transmitted by 5 bits, are used for indicating the change of a modulation scheme at the time of retransmission, it may signal a data block size (overlapped size is permitted) as much as 29*110. QPSK, 16 QAM, and 64 QAM are supported as modulation schemes. When a modulation scheme is changed at a switching point, if the same resource is allocated, the same data block size is indicated to efficiently operate in various channel environments. In order to indicate an actual data block size in consideration of the abovementioned contents, MCS-related information (e.g., IMCS) transmitted via a DL control channel is mapped to a different variable. Table 3 in the following illustrates a relation between IMCS and ITBS.

TABLE 3

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Downlink Transmission Mode and DCI Format

A bit configuration of control data transmitted via a DL control channel varies according to a DL transmission mode. This is referred to as a DL control information (DCI) format. A region in which the DL control channel is transmitted is divided into a common search space and a UE-specific search space. A control channel transmitted via the common search space is transmitted in a manner of being scrambled by an ID such as SI-RNTI/P-RNTI/RA-RNTI and uses a specific DCI format. Tables 4, 5, 6, 7, 8, and 9 described in the following illustrate a DCI format, a search space, and a transmission scheme when SI-RNTI, P-RNTI, RA-RNTI, C-RNTI, SPS C-RNTI, and temporary C-RNTI are used, respectively.

TABLE 4

| DCI format | Control channel Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity. |
| DCI format 1A | Common | If the number of PBCH antenna ports is one, Single-antenna port, port 0 is used, otherwise Transmit diversity |

TABLE 5

| Transmission mode | DCI format | Control channel Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2D | UE specific by C-RNTI | Up to 8 layer transmission, ports 7-14 |

TABLE 6

| Transmission mode | DCI format | Control channel Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Transmit diversity |
| Mode 4 | DCI format 1A | Common and UE specific by C-RNTI | Transmit diversity |
|  | DCI format 2 | UE specific by C-RNTI | Transmit diversity |

TABLE 6-continued

| Transmission mode | DCI format | Control channel Search Space | Transmission scheme of PDSCH corresponding to PDCCH |
|---|---|---|---|
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI | Single-antenna port, port 5 |
|  | DCI format 1 | UE specific by C-RNTI | Single-antenna port, port 5 |
| Mode 8 | DCI format 1A | Common and UE specific by C-RNTI | Single-antenna port, port 7 |
|  | DCI format 2B | UE specific by C-RNTI | Single-antenna port, port 7 or 8 |
| Mode 9 | DCI format 1A | Common and UE specific by C-RNTI | Single-antenna port, port 7 |
|  | DCI format 2C | UE specific by C-RNTI | Single-antenna port, port 7 or 8 |
| Mode 10 | DCI format 1A | Common and UE specific by C-RNTI | Single-antenna port, port 7 |
|  | DCI format 2D | UE specific by C-RNTI | Single-antenna port, port 7 or 8 |

TABLE 7

| DCI format | Control channel Search Space | Transmission scheme of PDSCH corresponding to PDCCH |
|---|---|---|
| DCI format 1A | Common and UE specific by Temporary C-RNTI | If the number of PBCH antenna port is one, Single-antenna port, port 0 is used, otherwise Transmit diversity |
| DCI format 1 | UE specific by Temporary C-RNTI | If the number of PBCH antenna port is one, Single-antenna port, port 0 is used, otherwise Transmit diversity |

In order to increase a peak data rate, it is necessary to transmit many data in unit time. TO this end, it is necessary to support a big transport block size. As a size of a transport block (TB) is getting bigger, the number of code blocks constructing a transport block may increase as well. In this case, when an error occurs on a partial code block only among the entire code blocks, if the entire transport blocks are retransmitted, it may lead to system performance deterioration. Hence, when a single transport block includes a plurality of code blocks, the present invention proposes a method of performing retransmission in a unit of a code block. If the present invention is applied, it is able to enhance throughput performance of a wireless communication system.

Assume that a transport block exceeding a specific size is segmented into a plurality of code blocks. A CRC (cyclic redundancy check) can be attached to a transport block to detect an error and a CRC can be attached to each of a plurality of code blocks to detect an error. In this case, a length of the CRC attached to the transport block may be different from a length of the CRC attached to the code block. In particular, it is preferable to generate the CRSs from generator polynomials different from each other.

In order to perform retransmission in a unit of a code block, it is preferable to detect a code block at which an error occurs via a CRC by performing decoding on the entire code blocks included in a transport block. And, it is preferable to transmit information on the code block at which the error occurs to a transmitting side (or transmitting end). Having received the feedback information on the code block at which the error occurs, the transmitting side retransmits the code block at which the error occurs only. In this case, it is preferable to transmit information on the retransmitted code block via a control channel to enable HARQ combining. A receiving side performs HARQ combining on the retransmitted code block with the previously transmitted code blocks and performs decoding. The transmitting side performs retransmission on a code block at which an error occurs only until an error does not occur or until a retransmission count becomes a maximum retransmission count using the same method.

Method of Providing Feedback on Code Block Error Information

If the number of code blocks constructing a transport block is equal to or less than a predefined number, a receiving side may provide feedback on ACK/NACK in a unit of a single ACK/NACK bit for the entire transport block rather than a unit of a code block. When the receiving end successfully performs decoding on all code blocks due to the retransmission of a transmitting end, the receiving end may transmit ACK for the transport block while not transmitting ACK/NACK for the code blocks. When the transmitting side performs retransmission as many as the maximum retransmission count, if the receiving end fails to successfully perform decoding on all code blocks, the receiving end may transmit NACK for the transport block while not transmitting ACK/NACK for the code blocks.

Meanwhile, the receiving side can provide feedback on information on the code blocks (e.g., code block index) to the transmitting side together with ACK/NACK information on a plurality of the code blocks. The code block index can be defined in an order of concatenating the code blocks. Or, when the transmitting end segments the code blocks, the transmitting end can transmit index information to the receiving end by adding the information to the segmented code block. In this case, ACK/NACK of a code block at which an error occurs can be transmitted as follows. When the receiving side transmits ACK/NACK in a unit of a code block, it is preferable not to transmit ACK/NACK for a transport block configured by the code block.

Method 1: A Receiving Side Defines an Order of Concatenating a Plurality of Code Blocks by a Code Block Index, Concatenates ACK/NACK of Each Code Block and Transmits the Concatenated ACK/NACK to a Transmitting Side Using a Bitmap Scheme.

According to a method 1-1 corresponding to a detail embodiment of the method 1, a length of the bitmap can be determined by a maximum value of the number of code blocks. If the number of code blocks constructing a scheduled transport block is less than a maximum value of the number of code blocks, it is preferable for the receiving side to transmit NACK as ACK/NACK for a code block excluding a code block in which ACK/NACK is actually detected by decoding. For example, assume that it is able to schedule a transport block consisting of maximum 100 code blocks. In this case, if a transport block consisting of 60 code blocks is scheduled, ACK/NACK corresponding to 60 bits is obtained for 60 code blocks and NACK is transmitted for the remaining 40 code blocks. ACK/NACK information of code blocks expressed by a bitmap is channel encoded again and can be transmitted.

According to a method 1-2 corresponding to a detail embodiment of the method 1, receiving side may transmit ACK/NACK for only scheduled code blocks by a type of bitmap. In this case, receiving side may feedback information on the number of scheduled code blocks. It may be preferable to independently encode the number of code blocks and ACK/NACK information.

According to a method 1-3 corresponding to a detail embodiment of the method 1, if the number of code blocks at which an error occurs is equal to or greater than a specific value, a transmitting side may retransmit all transport blocks. To this end, it may use a bitmap value that represents all code blocks as NACK. Or, it may designate and use a specific bitmap value.

According to a method 1-4 corresponding to a specific embodiment of the method 1, if the number of code blocks at which an error occurs is equal to or greater than a specific value, a transmitting side may retransmit all transport blocks. In this case, a receiving side may transmit single bit ACK/NACK instead of a bitmap. This can be comprehended as the receiving side transmits ACK/NACK for a transport block. The ACK/NACK for the transport block may transmitted via a physical channel different from a physical channel on which ACK/NACK for a code block is transmitted.

If the number of code blocks at which retransmission actually occurs is not that big, ACK/NACK for the retransmission can be replaced with a single ACK/NACK bit. In this case, the transmitted single ACK/NACK bit is ACK only when retransmitted code blocks are all successful. Otherwise, the single ACK/NACK bit is NACK. As a different method, it may be able to generate and transmit a bitmap corresponding to the number of retransmitted code blocks. In this case, the bitmap can be transmitted in a manner of being mapped according to an order of a code block index used for the first transmission.

Method 2: Method of Transmitting an Index of a Code Block at Which an Error Actually Occurs The number of indexes varies according to the number of code blocks at which an error occurs. Hence, a transmitting side additionally transmits information on the number of errors of code blocks to a receiving side and the receiving side can eliminate ambiguity capable of being occurred when the receiving side performs decoding. It is preferable to encode the information on the number of errors of code blocks and information on a code block index, respectively. In this case, if the number of code blocks at which an error occurs is equal to or greater than a specific value, the transmitting side may retransmit all transport block.

Method 3: Method of Generating Single ACK/NACK Per a Code Block Group Including One or More Code Blocks Instead of a Transport Block to Reduce Feedback Overhead A receiving side receives a transport block from a transmitting side. The transport block can include a plurality of code blocks. And, a code block group can include one or more code blocks. In this case, ACK/NACK may be transmitted in a unit of a code block group in response to the received transport block. The code block group may include at least one code block. ACK/NACK for a code block group including one or more code blocks is transmitted as ACK only when an error does not occur after decoding is performed on all code blocks included in the code block group. If an error occurs on any code block, it is preferable to transmit NACK. According to the method 1, a bitmap of an index of a code block group is transmitted. According to the method 2, an index of a code block group at which an error occurs is transmitted (it may include information on the number of code block groups at which an error occurs as well).

When a receiving side provides a feedback on ACK/NACK for a code block, a channel for transmitting the ACK/NACK can be defined. The receiving side can transmit ACK/NACK information for a code block for a downlink (DL) transport block via PUSCH (physical uplink shared channel). In this case, the PUSCH may apply channel coding (e.g., tail biting convolutional coding) different from channel coding (e.g., turbo coding) used for transmitting user data. The PUSCH carrying ACK/NACK for a plurality of code blocks may be transmitted via a time-frequency resource predefined by a transmitting/receiving side without an indication indicated by a DL control channel. Or, the PUSCH carrying ACK/NACK for a plurality of code blocks may be scheduled via a DL control channel of a format different from a DL control channel that schedules a general user data. When PUSCH on which ACK/NACK is transmitted and PUSCH on which user data is transmitted are transmitted at the same time in a single subframe, it may consider methods described in the following.

It may put a priority on the PUSCH carrying ACK/NACK than PUSCH carrying user data and the PUSCH carrying user data is not transmitted. In case of using such a multiple access scheme as SC-FDMA, it may have a merit in terms of PAPR.

It may transmit the PUSCH carrying ACK/NACK and the PUSCH carrying user data at the same time. In case of using such a multiple access scheme as OFDMA, it may have a merit in terms of latency.

ACK/NACK-related information and user data information are independently encoded while the PUSCH carrying ACK/NACK and the PUSCH carrying user data are transmitted at the same time. This is because ACK/NACK and user data require a different error rate. In case of using such a multiple access scheme as SC-FDMA, it may have a merit in terms of PAPR. However, since it is necessary to transmit the user data by performing puncturing on the user data, reception performance of the user data can be deteriorated.

ACK/NACK information of a code block for a UL transport block is transmitted via PDSCH. In this case, the PDSCH may apply channel coding (e.g., tail biting convolutional coding) different from channel coding (e.g., turbo coding) used for transmitting user data. The PDSCH carrying ACK/NACK for a plurality of code blocks can be transmitted via a time-frequency resource predefined by a transmitting/receiving side without an indication indicated by a DL control channel Or, the ACK/NACK information of a code block for a UL transport block can be scheduled via a DL control channel of a format different from a DL control channel that schedules a general user data. When PDSCH on which ACK/NACK is transmitted for a specific user and PDSCH on which user data is transmitted are transmitted at the same time in a single subframe, it may consider methods described in the following.

The PDSCH on which ACK/NACK is transmitted and the PDSCH on which user data is transmitted can be transmitted via a different frequency resource. In this case, the PDSCH on which ACK/NACK is transmitted and the PDSCH on which user data is transmitted may use a different channel coding scheme.

ACK/NACK can also be transmitted on the PDSCH on which user data is transmitted. In this case, it is preferable to independently encode the ACK/NACK and the user data. In this case, the ACK/NACK and the user data may use the same channel coding scheme.

In case of supporting retransmission in a unit of a code block, a DL control channel (e.g., PDCCH/EPDCCH) used for retransmission by a transmitting side may include control information different from that of a DL control channel for initial transmission. For example, DL control information for initial transmission may include information on a transport block (e.g., information on a transport block size). On the contrary, the DL control channel indicating retransmission may include information on a code block to be retransmitted (e.g., the number of code blocks, a code block index, a code block group index, etc.) in addition to the information on a transport block included in the DL control information for the initial transmission. Or, the DL control channel indicating retransmission may include information on code block to be retransmitted (e.g., the number of code blocks, a code block index, a code block group index, etc.) instead of the information (e.g., information on a transport block size) on a transport block included in the DL control information for initial transmission. This is because, when retransmission is performed, although a transport block size is not changed, since a code block or a code block group at which an error occurs is retransmitted only, the transmitting side provides information on code block to be retransmitted to the receiving side to make the receiving side perform HARQ combining.

The aforementioned contents of the method 3 can be applied to the method 1 and the method 2.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting/receiving a HARQ ACK/NACK signal in a wireless communication system can be applied to various wireless communication systems including 3GPP LTE/LTE-A, 5G system, and the like.

What is claimed is:

1. A method for transmitting a hybrid automatic repeat and request acknowledgement (HARQ-ACK) signal by a user equipment in a wireless communication system, the method comprising:
receiving a transport block (TB) containing a plurality of code blocks from a base station, one or more code block groups (CBGs) being determined from the plurality of code blocks;
based on a number of the one or more CBGs being less than a maximum number of CBGs for the TB, generating a negative-acknowledgement (NACK) value for each of at least one remaining CBG other than the one or more CBGs from among the maximum number of CBGs for the TB; and
transmitting the HARQ-ACK signal including the NACK value for each of the at least one remaining CBG to the base station.

2. The method of claim 1, wherein the transmitted HARQ-ACK signal includes an ACK value for a CBG when all code blocks of the CBG are successfully decoded.

3. The method of claim 1, wherein the transmitted HARQ-ACK signal includes an NACK value for a CBG when any code block of the CBG is not successfully decoded.

4. The method of claim 1, wherein one ACK value or NACK value is transmitted per CBG.

5. The method of claim 1, further comprising:
receiving, from the base station, a retransmission of a CBG corresponding to an NACK value from among the one or more CBGs.

6. A method for receiving a hybrid automatic repeat and request acknowledgement (HARQ-ACK) signal by a base station in a wireless communication system, the method comprising:
transmitting a transport block (TB) containing a plurality of code blocks to a user equipment, one or more code block groups (CBGs) being determined from the plurality of code blocks; and
based on a number of the one or more CBGs being less than a maximum number of CBGs for the TB, receiving, from the user equipment, the HARQ-ACK signal including a negative-acknowledgement (NACK) value for each of at least one remaining CBG other than the one or more CBGs from among the maximum number of CBGs for the TB.

7. The method of claim 6, wherein one ACK value or NACK value is received per CBG.

8. The method of claim 6, further comprising:
retransmitting, to the user equipment, a CBG corresponding to an NACK value from among the one or more CBGs.

9. A user equipment for transmitting a hybrid automatic repeat and request acknowledgement (HARQ-ACK) signal in a wireless communication system, the user equipment comprising:
- a receiver configured to receive a transport block containing a plurality of code blocks from a base station, one or more code block groups (CBGs) being determined from the plurality of code blocks;
- a processor configured to, based on a number of the one or more CBGs being less than a maximum number of CBGs for the TB, generate a negative-acknowledgement (NACK) value for each of at least one remaining CBG other than the one or more CBGs from among the maximum number of CBGs for the TB; and
- a transmitter configured to transmit the HARQ-ACK signal including the NACK value for each of the at least one remaining CBG to the base station.

10. The user equipment of claim 9, wherein the transmitted HARQ ACK signal includes an ACK value for a CBG when all code blocks of the CBG are successfully decoded.

11. The user equipment of claim 9, wherein the transmitted HARQ-ACK signal includes an NACK value for a CBG when any code block of the CBG is not successfully decoded.

12. The user equipment of claim 9, wherein one ACK value or NACK value is transmitted per CBG.

13. A base station for receiving a hybrid automatic repeat and request acknowledgement (HARQ-ACK) signal in a wireless communication system, the base station comprising:
- a transmitter configured to transmit a transport block (TB) containing a plurality of code blocks to a user equipment, one or more code block groups (CBGs) being determined from the plurality of code blocks; and
- a receiver configured to, based on a number of the one or more CBGs being less than a maximum number of CBGs for the TB, receive, from the user equipment, the HARQ-ACK signal including a negative-acknowledgement (NACK) value for each of at least one remaining CBG other than the one or more CBGs from among the maximum number of CBGs for the TB.

14. The base station of claim 13, wherein one ACK value or NACK value is received per CBG.

15. The base station of claim 13, wherein the transmitter is further configured to retransmit, to the user equipment, a CBG corresponding to an NACK value from among the one or more CBGs.

16. The user equipment of claim 9, wherein the receiver is further configured to receive, from the base station, a retransmission of a CBG corresponding to an NACK value from among the one or more CBGs.

* * * * *